United States Patent [19]
Ito

[11] 3,922,792
[45] Dec. 2, 1975

[54] GAUGING APPARATUS FOR WORKPIECE WITH TROCHOIDAL CROSS SECTION

[75] Inventor: Teruyuki Ito, Kariya, Japan

[73] Assignee: Toyoda Koki Kabushiki Kaisha, Japan

[22] Filed: Feb. 5, 1974

[21] Appl. No.: 439,694

[30] Foreign Application Priority Data
Feb. 21, 1973 Japan.............................. 48-21038

[52] U.S. Cl. ............. 33/174 R; 33/143 L; 33/149 J
[51] Int. Cl.² ........................................... G01B 5/20
[58] Field of Search .. 51/DIG. 32; 33/143 L, 147 K, 33/147 N, 148 R, 148 E, 148 F, 148 H, 149 R, 149 J, 174 R, 174 L

[56] References Cited
UNITED STATES PATENTS

| | | | |
|---|---|---|---|
| 611,391 | 9/1898 | Pike | 33/149 J |
| 1,740,695 | 12/1929 | Johansson | 33/147 K X |
| 2,988,008 | 6/1961 | Wankel | 418/61 A X |
| 3,663,188 | 5/1972 | Hoglund | 51/DIG. 32 X |
| 3,681,582 | 8/1972 | Kimio et al. | 33/143 L X |
| 3,755,909 | 9/1973 | Asano et al. | 33/143 L |
| 3,800,473 | 4/1974 | Levesque et al. | 51/DIG. 32 X |
| 3,813,818 | 6/1974 | Hayashi et al. | 51/DIG. 32 X |
| 3,828,481 | 8/1974 | Uhtenwoldt | 51/DIG. 32 X |
| 3,863,353 | 2/1975 | Saari | 33/174 R |

Primary Examiner—William D. Martin, Jr.
Assistant Examiner—Charles E. Phillips
Attorney, Agent, or Firm—Oblon, Fisher, Spivak, McClelland & Maier

[57] ABSTRACT

A gauging apparatus for measuring the bore of a workpiece, such as for example, a rotor housing for a rotary-piston internal combustion engine, includes a planetary driving mechanism which imparts to the workpiece a predetermined orbital motion whereby the configuration of a trochoid is generated upon the bore of the workpiece and the boundary points between the outer and inner envelopes of the trochoid pass through predetermined fixed positions. A sizing device disposed on a portion of the planetary driving mechanism for movement therewith is provided with a pair of measuring feelers which are engaged with the bore of the workpiece at the positions corresponding to the boundary points, so as to detect the dimensions of the bore in response to the relative displacement thereof during a grinding operation, and to obtain the desired trochoidal form.

8 Claims, 3 Drawing Figures

GAUGING APPARATUS FOR WORKPIECE WITH TROCHOIDAL CROSS SECTION

BACKGROUND OF THE INVENTION

1. Field of the Invention

The present invention relates generally to gauging apparatus, and more particularly to a gauging apparatus for inspecting or measuring the bore of a workpiece having a trochoidal curved surface during the machining thereof.

2. Description of the Prior Art

Conventional measurements or inspections of the dimensions of a bore of a workpiece formed with a trochoidal curved surface, such as, for example, a rotor housing which is to be utilized within a rotary-piston internal combustion engine, have been heretofore performed by manually removing the workpiece from the machine tool and manually placing the same upon a measuring device. Therefore, an operator is necessarily required to transfer and accurately position the machined workpiece upon the measuring device and thus, the machining efficiency and accuracy are substantially decreased. Furthermore, conventional measuring devices are not capable of controlling the feeding of the tool during the machining operation in accordance with a signal emitted by a sizing device and thus, the final size of the workpiece cannot be obtained as a result of a single setting of the machine tool.

SUMMARY OF THE INVENTION

Accordingly, it is an object of the present invention to provide a new and improved gauging apparatus capable of measuring the dimension of the bore of a workpiece formed with a trochoidal curved surface while a machining operation is being performed thereon.

Another object of the present invention is to provide an improved gauging apparatus which is simple in construction, but can nevertheless attain a high degree of measuring accuracy.

Still another object of the present invention is to provide an improved gauging apparatus wherein a sizing device can automatically control the feeding of a wheel head by generating a signal indicating that the bore of the workpiece has attained the predetermined trochoidal shape in cross-section.

A futher object of the present invention is to provide an improved gauging apparatus in which a pair of measuring feelers are engaged with the bore of the workpiece having the trochoidal configuration, and more specifically are engaged with the boundary points of the outer and inner envelopes of the trochoidal configuration in order to measure the same.

The foregoing objectives are achieved according to the present invention through the provision of a planetary driving mechanism which imparts to a workpiece a predetermined orbital motion so that the configuration of a trochoid is generated upon the bore of the workpiece and the boundary points between outer and inner envelopes of the trochoid pass through predetermined fixed positions. A sizing device disposed on a portion of the driving mechanism for movement therewith is provided with a pair of measuring feelers which are adapted to be held in abutting engagement with the bore of the workpiece at the positions corresponding to the boundary points so as to detect the dimensions of the bore in response to the relative displacement thereof during a grinding operation. When the bore of the workpiece attains the desired dimensions or size and is formed with the required trochoidal surface with the aid of the sizing device, the grinding operation is completed.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference numerals designate like or corresponding parts throughout the several views and wherein.

DETAILED DESCRIPTION OF A PREFERRED EMBODIMENT

Figure 1:
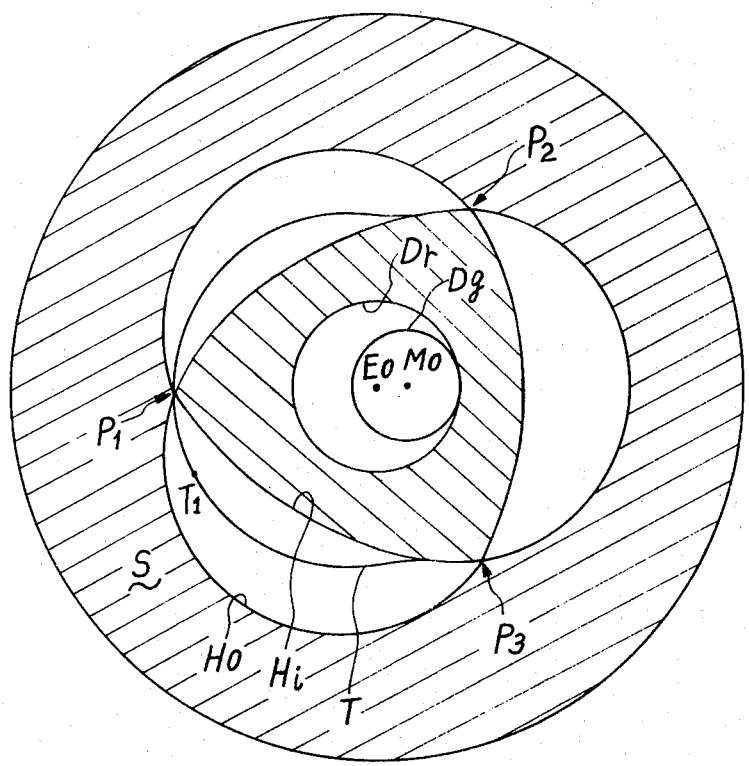
FIG. 1 is a diagrammatic view illustrating the operating principles with which the gauging apparatus constructed according to the present invention is concerned.

Referring now to the drawings, the operating principle or theory upon which the preferred embodiment of the present invention is essentially based will initially be fully explained with particular reference to FIG. 1 thereof. As seen in FIG. 1, when a component including a generating circle $Dr$ is eccentrically moved about another component such that the circle $Dr$ moves about the circumference of a basic circle $Dg$ provided within the other component, a specific form of trochoid, or more particularly a two-lobed peritrochoidal curve T, is traced or generated by means of, for example, a point T1 located upon an extended radius of the generating circle $Dr$, in accordance with a radius ratio of 3:2 between the radii of the generating circle $Dr$ and the basic circle $Dg$. Thereafter, the component and the basic circle $Dg$, which is fixed at the center Mo of the two-lobed peritrochoidal curve T, may be rolled along the generating circle $Dr$ which is fixed upon a plane S together with the peritrochoidal curve T.

At such time, if paint is applied over the entire extent of plane S, two kinds of zones appear thereon, that is, the paint will be eliminated from one zone and will remain within another zone, the boundary curves between the two zones respectively corresponding to an inner envelope form $Hi$ and an outer envelope form $Ho$. Furthermore, boundary points P1, P2 and P3 between the innr envelope form $Hi$ and the outer envelope form $Ho$ are always positioned upon the two-lobed peritrochoidal curve T, that is, such points P1, P2 and P3 are relatively immovable as if they were fixed thereon.

Therefore, when a workpiece is secured upon a basic member and a tool is arranged at one of the boundary points P1, P2 and P3 upon the plane S, such as, for example, at point P1, the surface having the above-mentioned two-lobed peritrochoidal curve is generated by means of the tool upon the bore of the workpiece. Simultaneously therewith, when the two-lobed peritrochoidal curve generated upon the bore of the workpiece is measured by means of a sizing device located at the other two points, that is points P2 and P3, which move about the curve but remain relatively fixed it may be accurately determined whether or not the size of the bore has reached the predetermined value.

An apparatus for measuring the bore of a workpiece having a trochoidal cross-sectional configuration and constructed according to the present invention will now be described and which may be particularly utilized to measure the bore of a workpiece, such as, for example, a rotor housing which is utilized within a rotary-piston internal combustion engine and formed with a peritrochoidal curved surface. Trochoidal generating motion in this case is imparted to the rotor housing in such a manner as to simulate the movements that would occur within the engine as if the engine rotor were stationary and the rotor housing free to rotate, it of course being realized that the reverse is of course true in practice.

Figure 2:
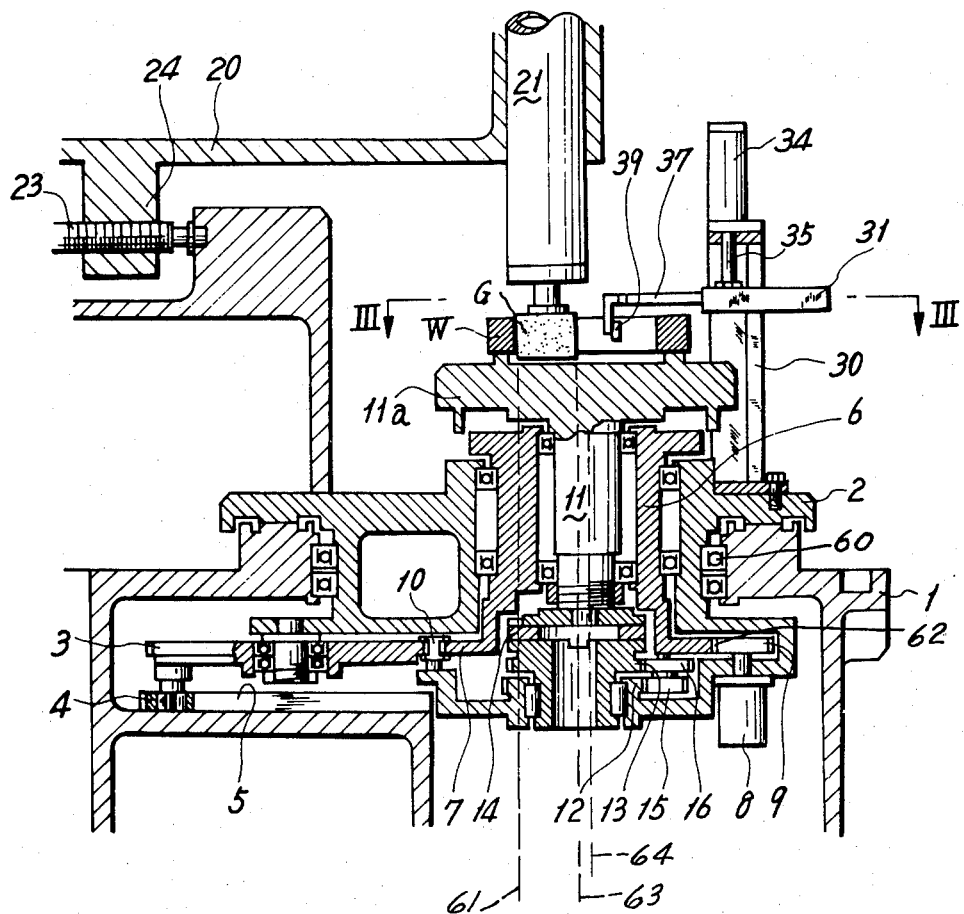
FIG. 2 is a cross-sectional view showing a gauging apparatus constructed according to the present invention.

Referring then to FIG. 2, a bed 1 is provided upon which an oscillating member 2, corresponding to the aforenoted basic member, is rotatably mounted, through antifrictional bearings 60, for pivotal movement about an axis centrally disposed within the bearings 60 and indicated by dashed-lines 61. A gear 3 is rotatably mounted upon the left portion of the oscillating member 2, as seen in the FIGURE, with a predetermined eccentricity, and a guide roller 4, rotatably and eccentrically supported upon gear 3, is slidably engaged within a guiding groove 5 formed upon the bed 1 in perpendicular relationship to the pivotal axis 61 of the oscillating member 2.

An eccentric sleeve 6, which serves as an eccentric rotating member, is similarly rotatably mounted within the oscillating member 2 at a position which of course deviates by a predetermined amount from the pivotal axis 61 thereof. Integrally formed upon the eccentric sleeve 6 is a gear 7 which is enmeshed as indicated by numeral 62, with a gear 9 secured upon a drive shaft of a hydraulic motor 8 which is fixedly mounted upon the oscillating member 2, gear 7 also being connected with gear 3 through an intermediate gear 10, which is rotatably mounted upon the oscillating member 2. Consequently, the gears 3 and 7 can be rotated at the same number of revolutions and in the same direction by means of the rotation of the eccentric sleeve 6.

Figure 3:
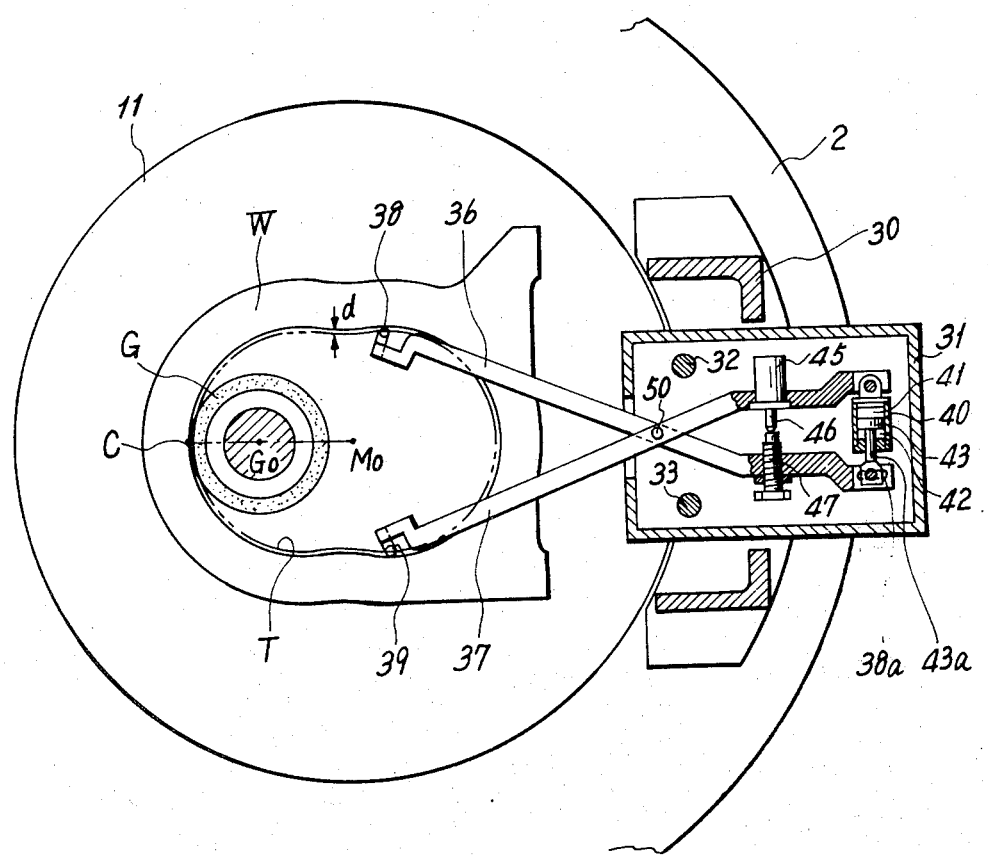
FIG. 3 is a cross-sectional view of the apparatus of FIG. 2 taken along the line III—III in FIG. 2.

A spindle 11 is eccentrically rotatably mounted within the eccentric sleeve 6 and a workpiece W, which may be employed as the rotor housing of a rotary-piston internal combustion engine and has a bore being formed with two peritrochoidally configured arches in cross section, as seen in FIG. 3, is fixedly mounted upon the upper end of the eccentric sleeve 6 through means of a work table 11a which is axially aligned with the spindle 11.

Disposed upon the oscillating member 2 is a sun gear 12 which is integrally formed therewith and so disposed as to be in axial alignment with the rotational axis of the eccentric sleeve 6, while a passive gear 13 is rotatably and coaxially supported within sun gear 12, an Oldham coupling 14 being used to connect the spindle 11 to the passive gear 13 such that the crossed keys thereof transmit motion from the passive gear 13 to the spindle 11 without introducing any irregularities into the movement.

A first planetary gear 15 and a second planetary gear 16 are integrally connected with each other and are further rotatably mounted upon the lower end of the eccentric sleeve 6. The first and second planetary gears 15 and 16 are meshingly engaged with the sun gear 12 and the passive gear 13, respectively, and consequently the spindle 11 and the work table 11a may be rotated about the common axis thereof through means of the passive gear 13 in a direction opposite to the rotation of the eccentric sleeve 6 when the eccentric sleeve 6 is rotated by means of the hydraulic motor 8.

In order to obtain the desired planetary orbit motion, the number of teeth upon the gears within the drive mechanism should be determined by the following formula:

$$\frac{Z1 \times Z4}{Z2 \times Z3} = \frac{3}{2}$$

wherein:
$Z1$ = the number of teeth of gear 12;
$Z2$ = the number of teeth of gear 13;
$Z3$ = the number of teeth of gear 15; and
$Z4$ = the number of teeth of gear 16.

Still referring to FIG. 2, a wheel head 20 is slidably mounted upon the bed 1, and a ram 21 is movable parallel to the axis of the bore of the workpiece W and within an extended portion of the wheel head 20, a grinding wheel G being rotatably supported upon the lower end of ram 21. The wheel head 20 may be moved radially of the bore of the workpiece W upon the bed 1 through means of a feed nut 24 fixed thereon and a feed screw 23 which is rotatably journaled upon the bed 1 at both ends thereof.

Within the above-described structure, the rotatable axes of the eccentric sleeve 6 and the spindle 11, respectively designated by dashed-lines 63 and 64, correspond respectively to the centers E$o$ and M$o$ of the generating circle D$r$ and the basic circle D$g$ as viewed in FIG. 1, and the pivotable center 61 of the oscillating member 2 similarly corresponds to the boundary point P1 as seen in FIG. 1. It is therefore readily understood that the internal or trochoidally curved surface of the bore of workpiece W fixedly mounted upon the work table 11a may be ground by means of the grinding wheel G, as viewed in FIG. 3.

The apparatus of the present invention is seen to further include a bracket 30, for supporting the sizing device of the apparatus, which is fixedly installed upon the oscillating member 2, and upon bracket 30 there is slidably secured a main body 31 of the sizing device which is guided upon pilot bars 32 and 33, as best seen in FIG. 3. A hydraulic cylinder 34 is secured to the upper portion of the bracket 30 and slidably receives a piston having a piston rod 35 which is secured to the main body 31 for raising and lowering the same, as seen in FIG. 2.

Referring now to FIG. 3, the construction of the sizing device is seen to include a pair of measuring levers 36 and 37 which are pivotable about a pin 50 which is fixedly mounted upon the main body 31. Measuring feelers 38 and 39 are respectively secured upon the left ends of the measuring levers and are adapted to be held in abutting engagement with the bore of the workpiece W in order to respond to the changes in the dimensions thereof. Furthermore, each of the feelers 38 and 39 is provided with an arcuate contact surface having a radius $d$ equal to the arcuate contact surface of each of the apex seals to be arranged at the corners of the rotor in order to conform the actual peritrochoid curve generated upon the bore of the workpiece W to a size which is enlarged by the amount $d$ so as to be greater than the theoretical peritrochoid curve which is traced by the apex of the rotor formed with the inner envelope as shown in FIG. 1. The points of contact between each of the feelers 38 and 39 and the bore of the workpiece W correspond to the points P2 and P3, as respectively shown in FIG. 1.

Interposed between the measuring levers 36 and 37 is hydraulic control cylinder 40 for controlling the closing and opening movements of the measuring levers 36 and 37, and slidably received within the hydraulic control cylinder 40 is a piston 43 from which a piston rod 43a extends. The hydraulic control cylinder 40 is pivotably connected with the right end of the measuring lever 37, while the right end of the measuring lever 36 is provided with a longitudinal slot 38a within which a pin, fixedly mounted upon the end of the piston rod 43a is engaged in such a manner that the lever 36 is pivotally connected with the piston rod. Thus, the measuring levers 36 and 37 may be relatively displaced and are capable of moving away from or toward each other by selectively supplying fluid under pressure into the piston chambers 41 and 42 of the control cylinder 40 from a fluid reservoir, not shown, the distance between the levers being regulated by the stroke of the piston 43.

As, also seen in FIG. 3, a displacement detector, such as for example, a differential transformer 45, is secured to the right portion of the measuring lever 37 so as to measure and detect the relative displacement of the measuring levers 36 and 37 and generates an electrical signal in response thereto, a detailed description of the differential transformer per se not being provided herein as the same is well known to those skilled in the art and is therefore deemed unnecessary. Similarly, an abutment bolt 47 which is to be contacted by a detecting rod 46 slidably carried within the differential transformer 45, is threadably and adjustably mounted upon the right portion of the measuring lever 36.

In operation, when the eccentric sleeve 6 is rotated, through gears 7 and 9, as a result of the actuation of the hydraulic motor 8, the spindle 11 is revolved about the rotational axis 63 of the eccentric sleeve 6 at the same speed. Simultaneously therewith, the spindle 11 is rotated about it own axis at a speed of one-half the number of revolutions of the eccentric sleeve 6 and in a rotational direction opposite to that thereof through means of the planetary driving gear mechanism system which includes gears 12, 13, 15 and 16, and the Oldham coupling 14. As a result of this planetary movement of the spindle 11, the workpiece W being carried by the spindle 11 is rotated through a predetermined orbital motion, thereby permitting the double-arched peritrochoidal curved surface of the bore of the workpiece W to be continually passed through a position C, as seen in FIG. 3, which corresponds to the point P1 as seen in FIG. 1.

In conjunction with the above, the gear 3 is also rotated at the same number of revolutions and in the same direction as that of the eccentric sleeve 6, through its meshing engagement with gear 7 thereof, but since the roller 4 carried by gear 3 is confined for movement in the guide groove 5, such rotation of the gear 3 results in the gear 3 being displaced within a plane perpendicular to the paper, as seen in the drawing and as a result of such, the oscillating member 2, upon which the gear 3 is mounted, is caused to be oscillated a predetermined amount about the pivotable axis 61 thereof within the bed 1 and in synchronous relation with the rotation of the eccentric sleeve 6, thereby freeing the guide roller 4 of the gear 3 to slide within the guiding groove 5, as indicated. Consequently, the line normal to the double-arched peritrochoidal curve at the position C passes through the rotational center Go of the grinding wheel G so that the grinding wheel contacts the bore of the workpiece W at the position C.

Thereafter, a grinding operation may be conducted upon the bore of the workpiece W by means of the grinding wheel G which moves beyond the pivotable center of the oscillating member 2 and the point P1 whereby the double-arched peritrochoidal curve required to be ground upon the bore of the workpiece is ground to a size which is analogously larger than the theoretical double-arched peritrochoid by the distance $d$.

Accordingly, when measurements of the dimensions of the bore of the workpiece W are required during the the grinding operation, the main body 31 of the sizing device may be moved downwardly by actuating the hydraulic control cylinder 34, to the predetermined position as seen in FIG. 2. At this time, the measuring feelers 38 and 39 of the pair of measuring levers 36 and 37 are inserted within the bore of the workpiece W. However, since at this time the fluid under pressure is being directed into the chamber 42 of the control cylinder 40, the measuring lever 36 and 37 are closed with respect to each other so that the measuring feelers 38 and 39 are not engaged with the bore of the workpiece W while they are being inserted therewithin.

After the measuring feelers 38 and 39 have been inserted within the bore of the workpiece W, pressurized fluid is supplied to the chamber 41 of the control cylinder 40, whereby the measuring levers 36 and 37 are consequently opened with respect to each other and whereby the measuring feelers 38 and 39 are maintained in an engaged position with the bore of the workpiece W under an appropriate predetermined force. The degree of opening or the distance between the measuring feelers 38 and 39 is changed during the course of the grinding operation and such changes are detected by means of the differential transformer 45.

Under the condition that the starting point of the peritrochoidal creating motion and the mounting position of the workpiece on the table 11a are fixed, the boundary points P2 and P3 remain at fixed positions relative to one another and to boundary point P1. It should therefore be realized that the measuring contacts or feelers 38, 39 will be, once exactly set at the boundary points P2, P3, always contacted with the inner periphery of the internal bore of the workpiece W at points corresponding to the boundary points P2, P3 throughout the turning of the workpiece to cause its double arch peritrochoidal bore thereof to be continuously passed through the grinding point C.

Thereafter, when the degree of opening or the relative displacement of the measuring feelers 38 and 39 reaches a predetermined value, that is, the bore of the workpiece W is formed so as to have a double-arched peritrochoidal curve of a required dimension, a sizing signal is emitted by the differential transformer 45 in order to thereby denote the end of the grinding operation. As a result of such sizing signal, the feeding of the grinding wheel G is terminated and thus, the grinding operation upon the bore of the workpiece W is ultimately completed. It is to be noted that when the grinding operation is completed, the double-arched peritrochoidal curve obtained upon the bore of the workpiece is analogously larger than the theoretical dobule-arched peritrochoid, the distance corresponding to the curvature radii of the arcuate surface of the measuring feelers 38 and 39 having been superimposed upon the theoretical double-arched peritrochoid.

Subsequently, when pressurized fluid is again supplied into chamber 42 of the control cylinder 40, the measuring levers 36 and 37 are closed with respect to each other and the main body 31 is moved upwardly by means of cylinder 34, toward a predetermined position so as not to be engaged with the bore of the workpiece W at which position the body 31 is maintained until it is maintained again utilized to measure the finished size of the bore of the workpiece W.

Although the measuring levers 36 and 37 are pivoted about pin 50 relative to each other in the aforenoted embodiment, they may of course be provided in parallel relation with respect to each other and be moved toward and away from the bore of the workpiece W in a radial direction thereof. In addition, the control cylinder 40 may be deleted and suitable spring means may be substituted therefor for opening and closing the measuring levers 36 and 37. Still further, though the sizing device described above is utilized while the grinding operation is being performed upon the bore of the workpiece, the same can also be applied to a gauging system which is utilized solely for measuring the dimensions of the bore of a workpiece which has already been ground. Yet further, it should of course also be realized that measurements of a bore having other trochoid curved surfaces can be performed upon the basis of a generating principle similar to that employed in conjunction with the double-arched peritrochoidal surface illustrated within the foregoing embodiment.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In an apparatus for machining a trochoidal bore of a workpiece having inner and outer envelopes and supported on a work spindle and a tool supported on a tool spindle being disposed so as to contact said workpiece at a first point of a plurality of predetermined boundary points disposed between said inner and outer envelopes, the improvements comprising:
    a basic member;
    a rotating member rotatably mounted within said basic member;
    said work spindle being rotatably mounted within said rotating member with a predetermined eccentricity with respect thereto for supporting said workpiece in axial alignment with said work spindle;
    trochoid generating drive means operatively connected with said rotating member and said work spindle for rotating said rotating member and said work spindle about their own axes with a predetermined rotational ratio therebetween and for revolving said work spindle about the axis of said rotating member, whereby a trochoidal motion is imparted to said work spindle and said workpiece supported thereon and draws the inner and outer envelopes of a trochoidal bore upon rotation of said work spindle by said trochoid generating drive means; and
    sizing means fixedly disposed on said basic member and being provided with feeler means for detecting the dimensions of said trochoidal bore of said workpiece by engaging said feeler means with said bore at at least a second point of said boundary points disposed between said inner and outer envelopes of said trochoidal bore while said workpiece is being rotated.

2. Apparatus as set forth in claim 1, wherein said trochoid generating drive means comprises;
    a drive motor fixedly mounted upon said basic member and operatively connected with said rotating member for rotating the same;
    coupling means operatively connected with said work spindle and rotatably mounted within the lower portion of said basic member and in axial alignment with said rotating member;
    gear train means rotatably mounted upon said rotating member and connected with said coupling means and said basic member so as to establish a predetermined relationship between the rotational speeds of said rotating member and said work spindle; and
    oscillating means connected with said rotating member and said basic member for oscillating said basic member.

3. Apparatus as set forth in claim 2, wherein said oscillating means comprises:
    first and second gears rotatably mounted upon said basic member and engaged with each other;
    a gear integrally connected with said rotating member and operatively engaged with said first gear for rotating said second gear at the same rotational speed as said rotating member; and
    a guide roller rotatably and eccentrically mounted upon said second gear and slidably received within a guiding groove which is provided upon said bed and extends in a direction perpendicular to the axis of said basic member.

4. Apparatus as set forth in claim 1, wherein said sizing means comprises:
    a main body slidably mounted upon a guiding member which is secured to said basic member;
    a pair of measuring levers, each having a measuring feeler disposed thereon, mounted upon said main body and operable for maintaining said measuring feelers in abutting engagement with the bore of said workpiece at said second and another of said boundary points;
    actuating means provided for operating said measuring levers; and
    detecting means including a displacement detector for detecting the relative displacement of said measuring feelers.

5. Apparatus as set forth in claim 4, wherein said actuating means comprises:
    a control cylinder pivotably connected with one of said measuring levers; and
    a piston rod integrally formed with a piston slidably received within said cylinder and being pivotably connected with the other one of said measuring levers.

6. Apparatus as set forth in claim 4, wherein said pair of measuring levers are pivotably connected with each other at a common pivot point.

7. Apparatus as set forth in claim 6, wherein said detecting means comprises:
    a differential transformer fixedly secured upon one of said measuring levers and having a detecting rod disposed therewithin; and an abutment member adjustably mounted upon the other of said measuring levers and engaged with said detecting rod.

8. Apparatus as set forth in claim 1, wherein said feeler means are provided with an arcuate contact surface having a predetermined radius of curvature which will compensate for the difference between a required trochoid curve generated upon said bore and a theoretical trochoid curve.

* * * * *